United States Patent [19]
Everett

[11] Patent Number: 5,898,231
[45] Date of Patent: Apr. 27, 1999

[54] ANTI-THEFT DEVICE FOR A VEHICLE

[76] Inventor: Gregory J. Everett, 24609 Eureka, Warren, Mich. 48091

[21] Appl. No.: 08/839,127

[22] Filed: Apr. 23, 1997

Related U.S. Application Data

[60] Provisional application No. 60/016,452, May 2, 1996.
[51] Int. Cl.$^6$ .................................................. B60R 25/00
[52] U.S. Cl. ........................................ 307/10.2; 180/287
[58] Field of Search ................................. 307/10.1–10.6; 70/264, 237, 240, 241, 256, 257, 277, 278, 280–282; 340/425.5, 426, 825.3–825.32, 825.34, 825.69, 825.72; 180/287, 289; 296/202

[56] References Cited

U.S. PATENT DOCUMENTS

| | | | |
|---|---|---|---|
| 4,615,558 | 10/1986 | Nakamura et al. | 296/202 |
| 4,633,688 | 1/1987 | Beudat et al. | 70/279 |
| 4,685,316 | 8/1987 | Hicks et al. | 70/256 |
| 4,837,567 | 6/1989 | Kleefeldt et al. | 340/825.31 |
| 5,124,565 | 6/1992 | Yoshida et al. | 307/9.1 |
| 5,224,567 | 7/1993 | Tomlinson | 180/287 |
| 5,287,006 | 2/1994 | Carlo et al. | 307/10.3 |
| 5,386,713 | 2/1995 | Wilson | 70/257 |
| 5,693,987 | 12/1997 | Krucoff | 307/10.2 |

*Primary Examiner*—Richard T. Elms
*Attorney, Agent, or Firm*—Weiner & Burt, P.C.; Pamela S. Burt; Irving M. Weiner

[57] ABSTRACT

An anti-theft device for a vehicle which includes dead bolt mechanism(s) for securing the door(s) of the vehicle such that no working parts of the mechanisms are accessible from the exterior or interior of the vehicle. The dead bolt mechanisms are actuated remotely by a portable hand-held transmitter which simultaneously operates to enable or disable the ignition circuit of the vehicle. In an enabled state of the anti-theft device, the dead bolts of the dead bolt mechanisms are retracted in an unlocked position and the vehicle ignition is operable. In a disabled state, the dead bolts of the dead bolt mechanisms are extended to a locked position and the vehicle ignition is inoperable so that the vehicle cannot be started.

5 Claims, 2 Drawing Sheets

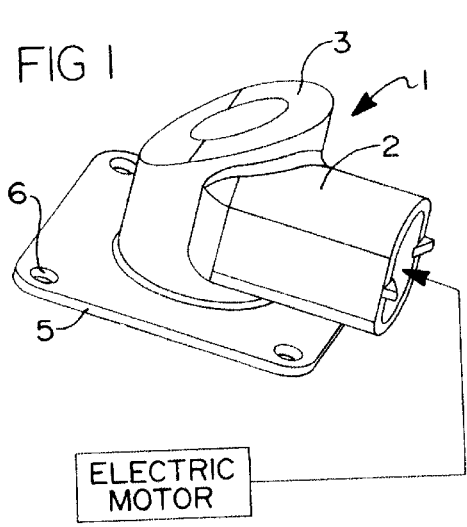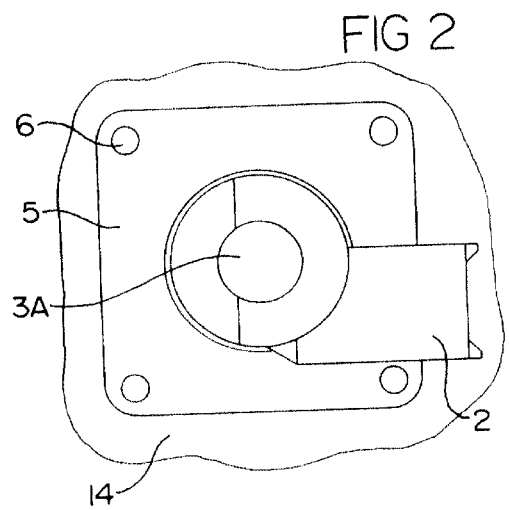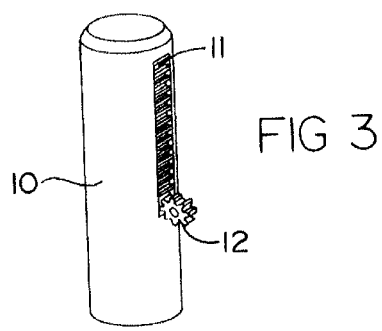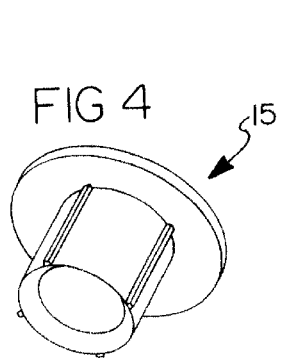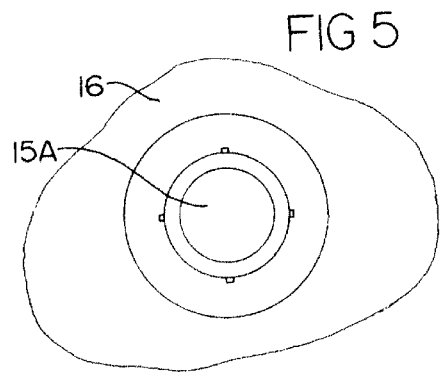

ANTI-THEFT DEVICE FOR A VEHICLE

This application is a continuation-in-part of U.S. Provisional application Ser. No. 60/016,452 filed May 2, 1996 in the name of Gregory J. Everett, entitled "Remote Control Anti-Theft Device."

BACKGROUND OF THE INVENTION

1. Field of the Invention

The present invention relates generally to an anti-theft device for a vehicle including a dead bolt mechanism which is remotely controlled by a hand held transmitter. More particularly, the device according to the invention includes a dead bolt mechanism which operates as an effective anti-theft device inasmuch as it lacks any external or accessible linkages, lock/unlock means, or working parts which an intruder might otherwise attempt to force or mechanically break. The dead bolt mechanism can be enabled and disabled only by means of the remote control transmitter. The anti-theft effect of the dead bolt mechanism is enhanced by electric circuitry for enabling and disabling the vehicle ignition system, which also is controlled by the remote transmitter. The dead bolt actuator and the vehicle ignition may both be substantially simultaneously enabled or disabled by activating the transmitter, so that even if an intruder forces his or her way into the vehicle through a window, the vehicle cannot be started without activating the transmitter to enable the ignition system.

2. Description of Relevant Art

The following United States patents disclose anti-theft locking devices and/or vehicle electric power supply control devices: U.S. Pat. No. 4,633,688 issued in 1987 to Beudat et al; U.S. Pat. No. 4,685,316 issued in 1987 to Hicks et al; U.S. Pat. No. 4,837,567 issued in 1989 to Kleefeldt et al; U.S. Pat. No. 5,124,565 issued in 1992 to Yoshida et al; U.S. Pat. No. 5,224,567 issued in 1993 to Tomlinson; and U.S. Pat. No. 5,287,006 issued in 1994 to Carlo et al. However, none of these patents disclose an anti-theft device for a vehicle employing a dead bolt mechanism either alone or in operable cooperation with vehicle ignition control circuitry to minimize any chance of a vehicle being stolen, as provided in the present invention.

SUMMARY OF THE INVENTION

The present invention provides an anti-theft device for a vehicle, comprising a dead bolt mechanism which includes a dead bolt mounted for linear translation within a housing, means for mounting the housing in a portion of a door of a vehicle, and actuator means connected to the dead bolt for translating the dead bolt between an unlocked position substantially within the housing and a locked position in which the dead bolt extends outwardly from the housing. Striker means are provided for receiving a portion of the dead bolt in the locked position, and means are provided for mounting the striker means in a door frame portion of the vehicle opposite the vehicle door portion in which the housing is mounted. The dead bolt mechanism is mounted in the door portion and the door frame portion of the vehicle such that the working parts of the mechanism are substantially inaccessible from either the exterior or interior of the vehicle.

In a preferred embodiment, first enable/disable means are connected to the actuator means of a dead bolt mechanism so as to move the dead bolt between the unlocked and locked positions, the first enable/disable means comprising a receiver disposed in the vehicle for receiving an encoded signal from a remote transmitter. Second enable/disable means are provided for enabling and disabling an ignition circuit of the vehicle, the second enable/disable means being connected between the receiver and the ignition circuit so as to enable or disable the ignition circuit when the encoded actuating signal is received by the receiver.

It is an object of the invention to provide one of the dead bolt mechanisms for each door of a vehicle, with each dead bolt mechanism being simultaneously enabled and disabled upon operation of the remote transmitter. Because none of the portions of the dead bolt mechanisms according to the invention are exposed for access either from outside or inside the vehicle, even if an intruder managed to force the conventional vehicle door lock(s), the dead bolt mechanism of the invention would prevent opening of the door(s). The dead bolt mechanism of the invention may also be employed as a substitute for a conventional vehicle door lock.

The above and further objects, features, details, and advantages of the invention will become apparent from the following detailed description when read in conjunction with the accompanying drawings.

BRIEF DESCRIPTION OF THE DRAWINGS

FIG. 1 is a perspective view of a dead bolt housing according to one embodiment of the invention.

FIG. 2 is a rear elevational view of the dead bolt housing of FIG. 1, as installed in a vehicle.

FIG. 3 is a perspective view of one embodiment of a dead bolt according to the invention.

FIG. 4 is a perspective view of a striker for receiving the dead bolt according to the invention.

FIG. 5 is a front view of the striker of FIG. 4, as installed in a vehicle.

DETAILED DESCRIPTION OF PREFERRED EMBODIMENTS

Figure 6:
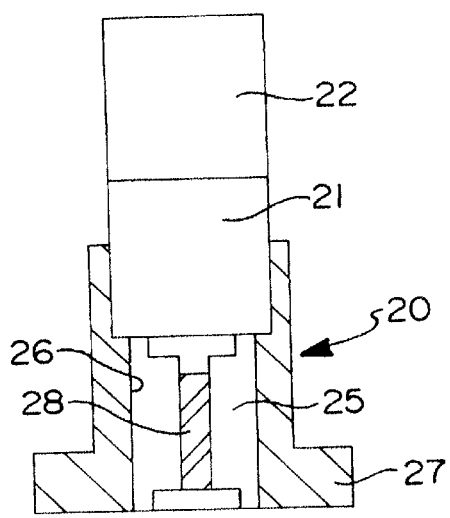
FIG. 6 is a partially cut-away elevational view of a dead bolt housing, including a dead bolt and actuator, in accordance with a preferred embodiment of the invention.

The basic features of the invention will first be described in detail with reference to FIGS. 1–5, which depict one exemplary embodiment of the invention. The features of a preferred embodiment of the invention will then be described in detail with reference to FIGS. 6–9.

With reference to FIGS. 1–5, there is shown a dead bolt housing 1 according to one exemplary embodiment of the invention. The housing 1 includes a housing portion 2 which houses an electric motor or other actuator means for actuating a dead bolt 10 (FIG. 3), the electric motor being connected to the vehicle battery as described in detail below. Housing 1 further includes a housing portion 3 formed with an aperture 3A (FIG. 2) which receives dead bolt 10 for linear translating movement therein. Housing portion 3 extends outwardly from the back side of a mounting plate 5, while housing portion 2 extends at substantially a right angle to housing portion 3, as shown most clearly in FIG. 1. As shown in FIGS. 2 and 3, the center axis of housing portion 2 is offset from the center axis of housing portion 3.

As shown in FIG. 3, the dead bolt 10 of this exemplary embodiment comprises a solid, elongated lock bolt having a toothed rack 11 extending longitudinally along an outer peripheral portion of dead bolt 10. Dead bolt 10 is shaped and dimensioned to be closely received within the aperture 3A of housing portion 3. It will be understood that while dead bolt 10 and aperture 3A are shown as having a cylindrical shape, other suitable shapes may alternatively be employed provided that dead bolt 10 has substantially the same shape and dimensions as aperture 3A so as to be closely received therein.

With reference to FIG. 3, a gear 12 is adapted to mesh with rack 11 to effect linear translation of dead bolt 10 in aperture 3A of housing portion 3. The gear 12 has a central aperture for mounting in a known manner on an output shaft (not shown) of the electric motor shown in FIG. 1. When thus operably mounted, gear 12 is rotated via the output shaft upon actuation of the electric motor. When gear 12 is rotated in a first direction via the output shaft, the gear meshes with rack 11 to translate dead bolt 10 such that it extends outwardly from aperture 3A in a locked position. When the output shaft is rotated in the opposite direction, gear 12 meshes with rack 11 to translate dead bolt 10 such that it is retracted inwardly into aperture 3A in an unlocked position.

The components of the dead bolt mechanism are arranged in housing 1 as follows. Dead bolt 10 is inserted in aperture 3a of housing portion 3 for linear translation therein. The electric motor for actuating the dead bolt mechanism is inserted in housing portion 2, with the output shaft thereof extending inwardly toward housing portion 3, and with the gear 12 secured to an end portion of the shaft. The gear 12 on the motor shaft is aligned with rack 11 of dead bolt 10 for meshing engagement therewith, such that when the output shaft rotates upon actuation of the motor, gear 12 rotates therewith and meshes with the teeth of rack 11 so as to cause the dead bolt 10 to translate in and out of housing portion 3, depending upon the direction of rotation of the output shaft.

As shown in FIGS. 4 and 5, a striker assembly 15 is provided with a central aperture 15A for receiving dead bolt 10 when it is linearly translated to a locked position. The aperture 15A of striker 15 is shaped and dimensioned to closely receive dead bolt 10 therein. While aperture 15A is shown as having a cylindrical shape, it will be understood that the shape and dimensions of aperture 15A can be adapted to match other alternative shapes of dead bolt 10, as discussed above.

The various components of the dead bolt mechanism, including housing 1, dead bolt 10, and striker 15, are fabricated from a strong, rigid material capable of withstanding operational stresses. By way of example, the components may be fabricated of high impact plastic materials, metal, etc. In use, the various components of the anti-theft device according to the invention are installed in a vehicle as described below, it being understood that the device can be installed either as original factory equipment during initial assembly or added to a new or used vehicle as optional equipment.

The dead bolt housing 1 is preferably mounted in each door of the vehicle at a point which is substantially distal from the door hinges, such as in a bottom wall of the door or in a side wall portion opposite the door hinges. To this end, suitable apertures are drilled or otherwise formed in the vehicle door for receiving the housing 1 such that the mounting plate 5 is substantially flush with the wall of the vehicle door. The housing 1 is secured in position within the vehicle door by suitable fasteners, such as screws or the like, received through the apertures 6 provided in mounting plate 5 (FIGS. 1 and 2).

During installation, the striker 15 is mounted in a vehicle door frame portion 16 opposite dead bolt housing 1 such that the aperture 15A of striker 15 is aligned with dead bolt 10 so as to receive same therein. It will be understood, however, that the positions of housing 1 and striker 15 may be reversed, i.e., the housing 1 can alternatively be mounted in the vehicle door frame 16 and the striker 15 mounted in the vehicle door 14. In either case, however, the mounting is such that the dead bolt mechanism is disposed substantially distal from the door hinges.

As thus installed, the dead bolt mechanism of the invention lacks external linkages or accessible working parts, thus preventing manipulation of the mechanism by force or mechanical means. Unlike conventional vehicle door locks which include both exterior and interior lock/unlock means susceptible to tampering, none of the portions of the dead bolt mechanism according to the invention are exposed for access either from outside or inside the vehicle. Thus, even if an intruder were successful in forcing or mechanically manipulating the conventional vehicle door lock to an unlocked condition, the dead bolt mechanism of the invention would prevent opening of the door. It will be understood, however, that the dead bolt mechanism of the invention may be employed instead of a conventional vehicle door lock rather than in addition thereto, thus eliminating the need for external door lock mechanisms and in turn reducing manufacturing costs and rusting of the vehicle door.

With reference to FIGS. 6–9, an alternative dead bolt arrangement according to a preferred embodiment of the invention comprises a dead bolt housing 20 which houses a gearhead 21. The gearhead 21 is operably connected at its rear end to a rearwardly extending electric motor 22 or other actuator means for actuating the gearhead 21 and, in turn, a dead bolt 25. The motor 22 is connected with the vehicle battery as described below. The dead bolt 25 is received within a cylindrical bore 26 of housing 20 for linear translating movement therein, with dead bolt 25 and cylindrical bore 26 being shaped and dimensioned such that dead bolt 25 is closely received within cylindrical bore 26. The forward end portion of housing 20 is provided with a circumferential flange portion 27 used in mounting the dead bolt arrangement as described below.

As shown in FIG. 6, a screwdrive type drive member 28 comprising an externally threaded shaft is operably connected at its rear end to gearhead 21. Drive member 28 extends forwardly from gearhead 21 so as to be operably received within a central axial bored portion of dead bolt 25 which is threaded so as to threadedly engage and operably cooperate with the threaded shaft of drive member 28. Upon actuation of motor 22, gearhead 21 causes drive member 28 to rotate such that the threaded shaft of drive member 28 cooperates with the threads on bore 28 to effect linear translation of dead bolt 25. When drive member 28 is rotated in a first direction via gearhead 21, the operable threaded engagement between the threaded shaft of drive member 28 and the threads on bore 28 causes dead bolt 25 to advance outwardly from housing bore 26 in a locked position. When drive member 28 is rotated in the opposite direction, dead bolt 25 is linearly translated in the opposite direction so that it is retraced inwardly into housing bore 26 in an unlocked position.

Figure 7:
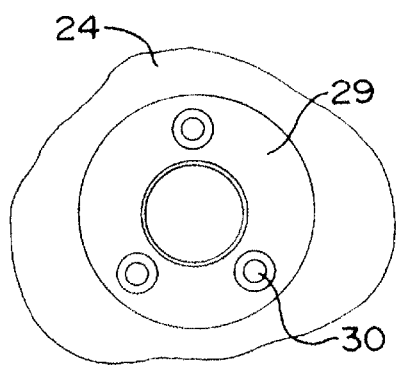
FIG. 7 is an elevational view of the exposed surface of the dead bolt housing of FIG. 6, as installed in a vehicle.

As with the dead bolt housing 1 of the first embodiment, the dead bolt housing 20 of this preferred embodiment is preferably mounted in the door of the vehicle at a point substantially distal from the door hinges, such as in a bottom wall of the door or in a side wall portion opposite the door hinges. Suitable apertures are drilled or otherwise formed in the vehicle door for receiving housing 20 such that the flange 27 abuts against an inside surface portion of a wall of the vehicle door. The housing 20 is secured in position within the vehicle door by means of a mounting cap 29 as shown in FIG. 7. The mounting cap 29 is fabricated of a strong rigid material, and may for example comprise a stamped steel cap. Any suitable type of fastener means 30, such as screws, rivets, or the like, are received through mating apertures provided in mounting cap 29, a wall portion 24 of the vehicle door, and the flange 27 of housing 20, so as to secure housing 20 in position within the vehicle door. When the dead bolt arrangement is thus operably mounted, the mounting cap 29 as shown in FIG. 7 is substantially flush with the wall portion 24 of the vehicle door.

Figure 8:
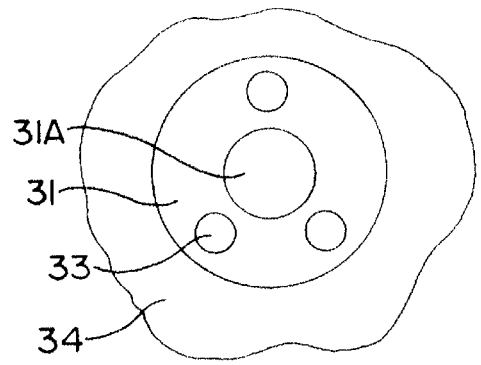
FIG. 8 is an elevational view of the exposed end of a striker for receiving the dead bolt shown in FIG. 6, as installed in a vehicle.
Figure 9:
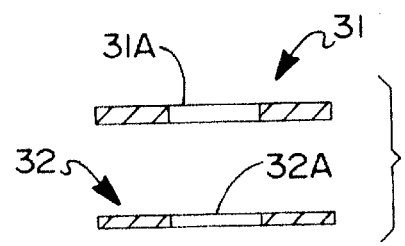
FIG. 9 is a cross sectional view of the striker of FIG. 8, together with a spacer therefor.

As shown in FIGS. 8 and 9, a striker 31 is provided with a central aperture 31A for receiving dead bolt 25 when it is linearly translated to a locked position. The aperture 31A is shaped and dimensioned to closely receive dead bolt 25 therein. In addition to striker 31, the striker assembly includes a spacer member 32 having a central aperture 32A which corresponds in size and shape with aperture 31A of the striker 31. During installation, the striker 31 is mounted in a vehicle door frame portion 34 opposite dead bolt housing 20 such that the aperture 31A of striker 31 is aligned with dead bolt 25 so as to receive same therein in a locked position. To this end, an aperture is provided in the vehicle door frame portion 34 which corresponds in size and shape to the aperture 32A of spacer 32 and the aperture 31A of striker 31. The striker spacer 32 is positioned on the frame such that the aperture 32A is aligned with the aperture in the frame, and the striker 31 is in turn positioned on the spacer 32 such that the aperture 31A is aligned with the aperture 32A and the aperture in the frame. Suitable fasteners 33 (FIG. 8), such as screws, rivets, or the like, are then secured through suitable apertures provided in striker 31, spacer 32, and the vehicle door frame. As thus mounted, the striker assembly is aligned so that the dead bolt 25 extends in the locked position through the aligned apertures of striker 31, spacer 32, and the vehicle door frame.

As with the first embodiment, it will be understood that the positions of housing 20 and striker assembly 31, 32 may be reversed such that housing 20 is alternatively mounted in the vehicle door frame and the striker assembly 31, 32 is mounted in the vehicle door. In any event, the mounting is preferably such that the dead bolt mechanism is disposed substantially distal from the door hinges. Also as with the first embodiment, the various components of the dead bolt mechanism, including housing 20, dead bolt 25, and striker assembly 31, 32 are fabricated from a strong, rigid material capable of withstanding operational stresses, such as metal, high impact plastic materials, etc.

Once installed, the dead bolt mechanism of the preferred embodiment of the invention shown in FIGS. 6–9 has the same basic desirable features as does the first embodiment of FIGS. 1–5, while also affording additional advantages. As with the first embodiment, the mechanism of the preferred embodiment lacks external linkages or accessible working parts so as to prevent manipulation of the mechanism by force or mechanical means. Unlike conventional vehicle door locks, none of the portions of the dead bolt mechanism according to the preferred embodiment are exposed for access either from outside or inside the vehicle. Also as with the first embodiment, the dead bolt mechanism of the preferred embodiment shown in FIGS. 6–9 may be employed instead of a conventional vehicle door lock rather than in addition thereto. The preferred embodiment of FIGS. 6–9 also provides the additional advantages of a simplified and more compact structure, while being mechanically strong and reliable.

It will be understood that the invention is not limited to the particular dead bolt mechanisms described above. By way of example, the dead bolt actuator may have an output shaft which is linearly translated in and out, rather than being rotated. The actuator shaft would be attached directly to one end of the dead bolt so that the dead bolt is extended and retracted as the actuator shaft translates. It is also contemplated that in lieu of an electric motor, the dead bolt actuator may take the form of a solenoid or other suitable actuating means.

Figure 10:
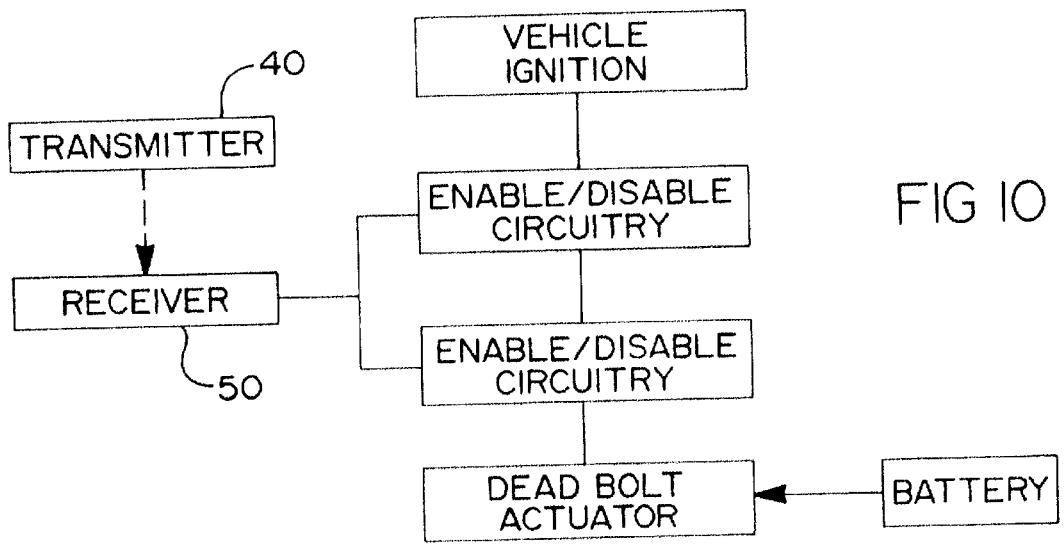
FIG. 10 is a block diagram showing in schematic form the various components of the anti-theft device according to the invention.

With reference to FIG. 10 which shows the invention schematically, the electric means for enabling and disabling the anti-theft device of the invention for both the exemplary embodiment of FIGS. 1–5 and the preferred embodiment of FIGS. 6–9 will now be described. A portable hand-held transmitter 40 is provided for transmitting an encoded signal to a receiver 50 mounted in the vehicle. The transmitter 40 is preferably of a known push button type, and is sufficiently compact to be retained on the user's key ring or stored in a purse, pocket, etc. The receiver 50 may be of a known type which receives an encoded signal from the transmitter 40, decodes the signal, and sends a signal to enable/disable circuitry described in detail below. The receiver 50, which is mounted in a concealed location in the vehicle, is sufficiently sensitive to receive a signal from transmitter 40 at a distance of at least several feet from the vehicle.

The receiver 50 is connected via enable/disable circuitry components to both the vehicle ignition circuit and the actuator (e.g., electric motor) of the dead bolt mechanism. The circuitry components may take the form of known components including switch(es), trigger circuit(s), amplifier(s), and/or relay(s) arranged such that a signal received from receiver 40 is conditioned and transmitted to the ignition circuit of the vehicle and the dead bolt actuator so as to enable or disable same, with power being supplied by the battery of the vehicle. One exemplary circuit arrangement of a suitable type is disclosed in U.S. Pat. No. 5,224,567 issued Jul. 6, 1993 to Tomlinson. If desired, additional similar circuitry means may be provided for enabling and disabling a conventional vehicle alarm device, such as one which sounds the vehicle horn, activates a siren, and/or activates the vehicle lights. Such an optional alarm may also be controlled in a known manner by a conventional motion-sensing device, to further enhance security of the vehicle.

An important feature of the invention is that when transmitter 40 is activated by the user to remotely transmit a signal to receiver 50, the enable/disable circuitry functions to simultaneously enable, or simultaneously disable, both the vehicle ignition and the dead bolt actuator. In the enabled state, the dead bolt actuator operates to translate dead bolt 10 or 25 to a retracted or unlocked position, and the vehicle ignition is operable. In the disabled state, the dead bolt actuator operates to translate dead bolt 10 or 25 to an extended position so that it is received within striker 7 or 31, 32 in a locked position, and the vehicle ignition is inoperable so that the vehicle cannot be started. As such, in the disabled condition, even if an intruder is able to access the interior of the vehicle such as through a window, the inoperability of the vehicle ignition will prevent theft of the vehicle. Even if the intruder were somehow able to mechanically force dead bolt 4 or 25 from the locked condition, theft is prevented because the vehicle ignition will still remain disabled. Only when transmitter 40 is activated to remotely switch to the enabled state will the ignition be operable to start the vehicle.

It will be understood that one of the dead bolt mechanisms as described above is provided for each door of the vehicle so as to secure the entire vehicle, and that enable/disable circuitry is provided for actuating each dead bolt mechanism. In a preferred embodiment, the enable/disable circuitry functions to simultaneously enable or disable all dead bolt mechanisms mounted in the vehicle.

While there have been described above what are at present believed to be the preferred embodiments of the invention, it will be understood that various modifications may be made therein without departing from the spirit and scope of the invention. The present embodiments are therefore to be considered in all respects as illustrative, and not restrictive. The scope of the invention is indicated by the appended claims rather than by the foregoing description.

I claim:

1. An anti-theft device for a vehicle including a dead bolt mechanism comprising:
    a dead bolt mounted for linear translation within a housing;
    means for mounting said housing in a portion of a door of a vehicle;
    actuator means connected to said dead bolt for translating said dead bolt between an unlocked position substantially within said housing and a locked position in which said dead bolt extends outwardly from said housing;
    striker means for receiving a portion of said dead bolt in said locked position;
    means for mounting said striker means in a door frame portion of said vehicle opposite said vehicle door portion in which said housing is mounted;
    said dead bolt mechanism being mounted in said door portion and said door frame portion of said vehicle such that the working parts of said mechanism are substantially inaccessible from either the exterior or interior of said vehicle;
    said actuator means is connected with a battery of said vehicle so as to receive power therefrom;
    said actuator means is further connected to means for enabling and disabling said actuator means so as to move said dead bolt between said unlocked and locked positions;
    said enable/disable means comprises a receiver disposed in said vehicle for receiving an encoded signal from a transmitter, and enable/disable circuitry connected between said receiver and said actuator means;
    a portable transmitter for transmitting an encoded actuating signal to said receiver;
    said actuator means comprises an electric motor connected with said battery of said vehicle; and
    said actuator means further comprises a dead bolt drive member, and gearhead means, connected between said motor and said drive member, for actuating said drive member when said encoded actuating signal is received by said receiver.

2. An anti-theft device for a vehicle according to claim 1, wherein:
    said dead bolt drive member comprises a threaded shaft;
    said dead bolt has a threaded bore formed therein for threadedly receiving said threaded shaft; and
    when said encoded actuating signal is received by said receiver, said gearhead means rotates said threaded shaft so as to effect linear translation of said dead bolt between said locked and unlocked positions.

3. An anti-theft device for a vehicle having an electrical system including an ignition system and a battery for supplying power thereto, comprising:
    dead bolt means for securing a door of said vehicle such that the working parts of said dead bolt means are substantially inaccessible from both the exterior and interior of said vehicle;
    said dead bolt means comprising a dead bolt, and actuator means for moving said dead bolt between unlocked and locked positions;
    first enable/disable means, connected to said actuator means for enabling and disabling said actuator means so as to move said dead bolt between said unlocked and locked positions;
    said first enable/disable means comprising a receiver for receiving an encoded signal from a remote transmitter;
    second enable/disable means for enabling and disabling said ignition circuit of said vehicle, said second enable/disable means being adapted to be connected between said receiver and said vehicle ignition circuit so as to selectively enable or disable said vehicle ignition circuit when said encoded actuating signal is received by said receiver;
    a housing having said dead bolt mounted therein for linear translation;
    means mounting said housing in a portion of a door of said vehicle;
    said actuator means being connected to said dead bolt so as to translate said dead bolt between said unlocked position substantially within said housing and said locked position in which said dead bolt extends outwardly from said housing;
    striker means for receiving a portion of said dead bolt in said locked position;
    means for mounting said striker means in a door frame portion of said vehicle opposite said vehicle door portion in which said housing is mounted; and
    said actuator means comprises an electric motor connected with said battery of said vehicle so as to receive power therefrom.

4. An anti-theft device for a vehicle according to claim 3, wherein:
    said actuator means further comprises a dead bolt drive member, and gearhead means, connected between said motor and said drive member, for actuating said drive member when said encoded actuating signal is received by said receiver;
    said dead bolt drive member comprises a threaded shaft;
    said dead bolt has a threaded bore formed therein for threadedly receiving said threaded shaft; and
    when said encoded actuating signal is received by said receiver, said gearhead means rotates said threaded shaft so as to effect linear translation of said dead bolt between said locked and unlocked positions.

5. An anti-theft device for a vehicle according to claim 3, wherein:
    said actuator means further comprises a gear mounted to an output shaft of said electric motor; and
    said dead bolt is provided with a toothed rack which operably cooperates with said gear to effect linear translation of said dead bolt.

* * * * *